(12) United States Patent
Koch

(10) Patent No.: US 7,173,830 B2
(45) Date of Patent: Feb. 6, 2007

(54) DEVICE FOR CONVERTING AN AC VOLTAGE FROM A MAIN ELECTRICITY SUPPLY TO A DC VOLTAGE AT A PREDETERMINED LEVEL AND WAVEFORM

(75) Inventor: René Frederik Koch, BC Mijdrecht (NL)

(73) Assignee: Leader Electronics Inc., Hsin-Tien (TW)

( * ) Notice: Subject to any disclaimer, the term of this patent is extended or adjusted under 35 U.S.C. 154(b) by 0 days.

(21) Appl. No.: 10/525,897

(22) PCT Filed: Dec. 19, 2003

(86) PCT No.: PCT/NL03/00917

§ 371 (c)(1),
(2), (4) Date: Feb. 25, 2005

(87) PCT Pub. No.: WO2004/057145

PCT Pub. Date: Jul. 8, 2004

(65) Prior Publication Data

US 2005/0270809 A1    Dec. 8, 2005

(30) Foreign Application Priority Data

Dec. 20, 2002  (NL) ................................. 1022226

(51) Int. Cl.
*H02M 3/335* (2006.01)
(52) U.S. Cl. ........................... 363/18; 363/131
(58) Field of Classification Search ............ 363/16, 363/17, 18, 19, 22, 23, 131, 132, 133
See application file for complete search history.

(56) References Cited

U.S. PATENT DOCUMENTS

| | | | | |
|---|---|---|---|---|
| 3,660,724 A | | 5/1972 | Berger ........................ 317/16 |
| 4,272,805 A | | 6/1981 | Iguchi et al. ................ 363/19 |
| 4,408,267 A | * | 10/1983 | Pruitt .......................... 363/17 |
| 5,276,393 A | * | 1/1994 | Gali ........................... 320/101 |
| 5,555,494 A | * | 9/1996 | Morris ........................ 363/17 |
| 5,801,932 A | * | 9/1998 | Hwang et al. ........... 363/21.04 |
| 5,838,552 A | * | 11/1998 | Fraidlin et al. ............. 363/16 |
| 5,875,103 A | * | 2/1999 | Bhagwat et al. ............ 363/17 |
| 5,907,479 A | * | 5/1999 | Leu ............................. 363/16 |
| 5,999,417 A | * | 12/1999 | Schlecht ...................... 363/16 |

FOREIGN PATENT DOCUMENTS

DE          3427221        1/1986

* cited by examiner

*Primary Examiner*—Jeffrey Sterrett
(74) *Attorney, Agent, or Firm*—Alan D. Kamrath; Nikolai & Mersereau, P.A.

(57) ABSTRACT

The present invention relates to a device (10) for converting an AC voltage from the mains electricity supply into a DC voltage of predetermined level (and waveform), comprising:—a rectifier circuit (16, 17, 18, 19) for connecting to the mains electricity supply;—a switching circuit connected to the rectifier circuit;—a main transformer (26) connected to the switching circuit and—an auxiliary transformer (28) which is connected to the switching circuit and the secondary winding of which is coupled to the secondary winding of the main transformer such that the current through the switching circuit and the main transformer is limited to a predetermined value.

26 Claims, 1 Drawing Sheet

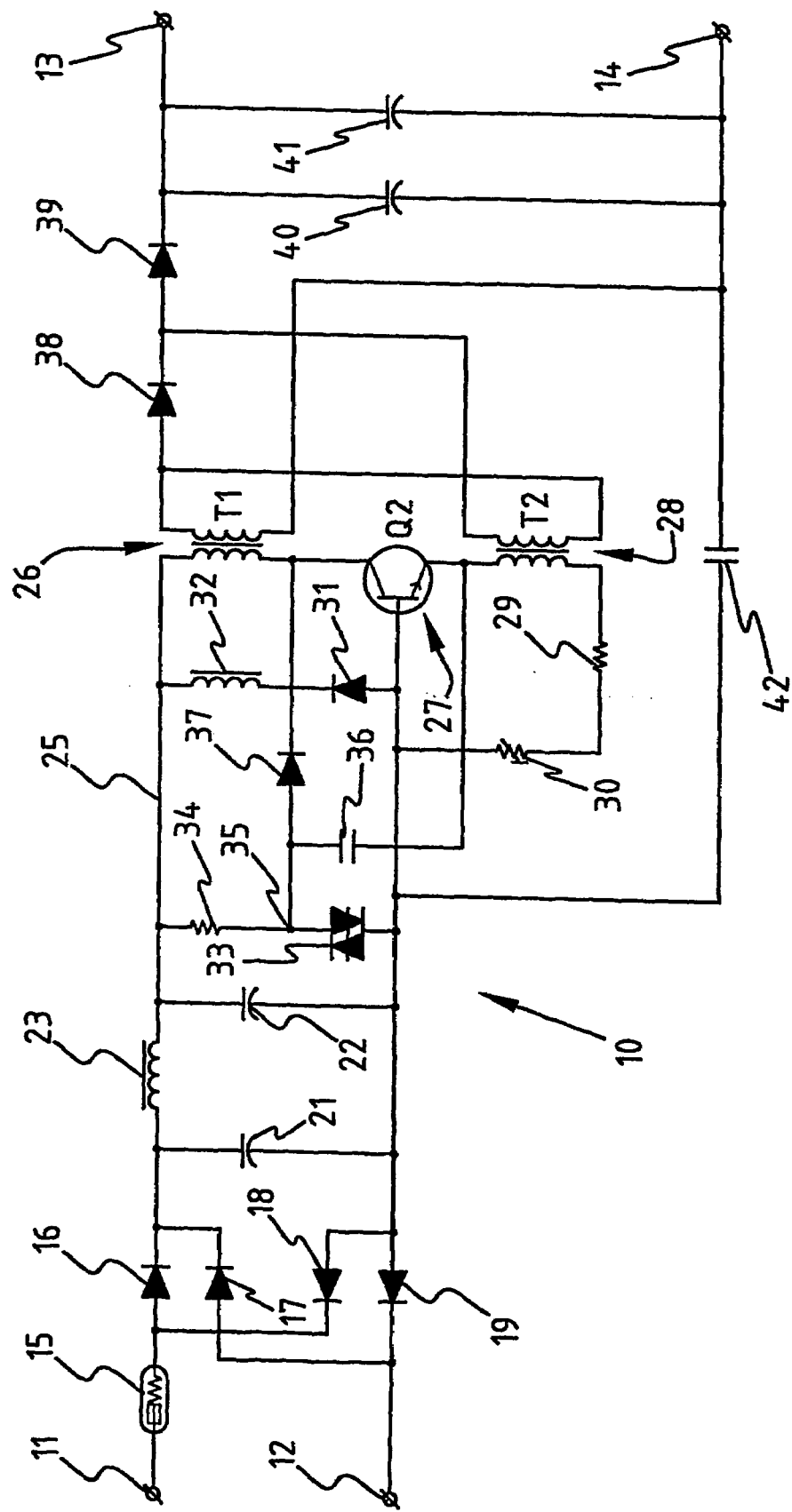

DEVICE FOR CONVERTING AN AC VOLTAGE FROM A MAIN ELECTRICITY SUPPLY TO A DC VOLTAGE AT A PREDETERMINED LEVEL AND WAVEFORM

CROSS REFERENCE

This application is the US national phase of International Application No. PCT/NL2003/000917, filed Dec. 19, 2003, which designated the U.S., the entire contents of which is hereby incorporated by reference.

BACKGROUND OF THE INVENTION

1. Field of the invention

The invention relates to a device and method for converting an AC voltage.

2. Related Art

For the purpose of charging laptops, computers, mobile phones and the like there is a rapidly increasing demand for compact and low-price devices for converting a mains voltage to a desired DC voltage of predetermined value, for instance 12, 24 or 36 V, optionally with flattened waveform on the DC voltage side.

U.S. Pat. No. 3,660,724 discloses an improved protective circuit wherein a silicon controlled rectifier is switched into circuit with a power supply in the presence of excessive output voltage, so as to protect the electronic equipment which is normally energized by the power supply.

DE-A-3427221 discloses a circuit in which the output voltage is compared with a reference voltage in a secondary circuit.

U.S. Pat. No. 4,272,805 discloses a switching regulator in which an input DC voltage is chopped and then applied to drive a transformer from which an AC voltage is derived which in turn is rectified in a rectifier circuit.

Existing so-called converters of the linear type are large and heavy and consume a considerable amount of power, even when no voltage is being consumed.

SUMMARY OF THE INVENTION

The present invention has for its object to obviate one or more of the above stated problems.

The present invention provides a device for converting an AC voltage from the mains electricity supply into a DC voltage of predetermined level (and waveform), comprising:
  a rectifier circuit for connecting to the mains electricity supply;
  a switching circuit connected to the rectifier circuit;
  a main transformer connected to the switching circuit; and
  an auxiliary transformer which is connected to the switching circuit and the secondary winding of which is coupled to the secondary winding of the main transformer such that the current through the switching circuit and the main transformer is limited to a predetermined value.

As a result of the present invention a device for a mobile phone and the like with a relatively small number of components can be obtained at a relatively low cost price.

In a preferred embodiment the mains voltage is filtered by means of a relatively small number of diodes of low cost price and a single capacitor and self-induction element, for instance in the so-called Butterworth configuration.

The switching device is preferably operated at a frequency of 64 kHz or higher, so that humans and animals suffer little inconvenience therefrom.

In a preferred embodiment use is made of a so-called Common-Base power transistor, which in further preferred embodiments is protected against too high a current and too high a temperature.

This protection is preferably achieved by means of a diode on the secondary side of the auxiliary transformer, although a (Zener) diode of relatively low cost price on the primary winding of the auxiliary transformer can likewise be envisaged in order to hold the temperature of the power transistor at about 80° C. to 85° C., in any event clearly below 100° C. The limitation in the temperature rise of this power transistor depends partly on the steepness of the characteristic of the (Zener) diode on the primary or secondary side of the transformer, or on the sharp bend in the characteristic thereof, so as to limit current value.

The transistor is preferably a bipolar transistor, the cost price of which is a factor of about 2.5 lower than a usual power transistor of the MOSFET type.

The present invention requires relatively few components of standard make, so that the cost price can remain low.

Further advantages, features and details of the present invention will be elucidated on the basis of the following description of a preferred embodiment thereof, with reference to the annexed figure showing a circuit diagram thereof.

BRIEF DESCRIPTION OF THE DRAWING

FIG. 1 is a detailed circuit diagram in accordance with the present invention.

DETAILED DESCRIPTION OF THE PREFERRED EMBODIMENT

A device 10 is provided on one side with connecting terminals 11, 12 for connecting to the mains supply, and on the other side with connections 13 and 14 to which can be connected a battery of a mobile phone, laptop and the like. Device 10 is provided with a fuse 15 and four diodes 16, 17, 18, 19 for rectifying an AC voltage of for instance 120 V to a so-called rail or bus voltage of about 170 V. Circuit 10 further comprises two capacitors 21 and 22 and, connected therebetween, a self-induction element 23 in so-called Butterworth configuration for the purpose of filtering the rectified voltage. Further connected to line 25 is the primary winding of a transformer 26 which is connected on the other side to a power transistor 27 which is connected in the so-called Common Base configuration and the emitter of which is connected to the primary winding of an auxiliary transformer 28, which is connected on the other side via resistor 29 and a temperature-sensitive NTC resistor 30 to the base of transistor 27. Between the base of power transistor 27 and line 25 are further connected a diode 31 and a self-induction element 32. Further connected to the base of power transistor 27 is a DIAC 33 with thyristor action, which is connected in turn to line 25 via a resistor 34. The node 35 between DIAC 33 and resistor 34 is further connected via a capacitor 36 of relatively small capacity to the emitter with power transistor 27 and further via a diode 37 to the collector thereof. The secondary winding of auxiliary transistor 28 is connected to the secondary winding of main transistor 26 via a diode 38. A second diode 39 is connected in series with diode 38 to the secondary winding of transistor 26, while in the shown preferred embodiment two capacitors 40, 41 are connected. Via a capacitor 42 the connecting terminal 14 is connected to the base of power transistor 27.

After energizing of connecting terminals 11 and 12, for instance up to an AC voltage of 120 V, capacitors 21 and 22 can be charged up to a voltage of for instance 170 V. Capacitor 36 will be charged via resistor 34 until DIAC 33 comes into operation, for instance at a voltage of 45 V. Capacitor C3 will now be discharged to the emitter of transistor 27, whereby a voltage will appear at the primary winding of main transformer 26. The output capacitors 40 and 41 will be immediately charged, while the current with which these capacitors are charged can be fed back to the emitter of transistor 27, whereby this latter remains in conductive state.

Transistor 27 continues to conduct as long as the emitter current is greater than the base current. As soon as main transformer 26 or auxiliary transformer 28 becomes saturated or current begins to flow through diode 38, the transistor will be switched off.

At low load the transistor will be switched off due to saturation of main transformer 26. At higher load the voltage on the primary winding of auxiliary transformer 28 will increase, wherein transistor 27 must be switched off when auxiliary transformer 28 is saturated. Power transistor 27 will also switch off when the diode 38 begins to conduct, which means that a current is flowing through resistors 29 and 30. Power transistor 27 will be switched off when the closed loop amplification has decreased sufficiently. As transistor 27 heats up the resistance value of resistor 30 will increase, whereby power transistor 27 will eventually be switched off.

Restarting of transistor 27 (Q2) takes place automatically using self-induction element 32.

As soon as a relatively small current begins to flow in a secondary winding of main transformer 26, a correspondingly small current in the emitter of power transistor 27 will soon switch the latter on again.

The above described preferred embodiment of a device according to the present invention with an output of 15–20 Watt can be arranged in the housing of a standard M5 type. The weight can amount to less than 100 grams, while the device will consume less than 0.1 Watt of power if no load is connected to terminals 13, 14, while the output voltage is maintained.

With a relatively small number of components, i.e. auxiliary transformer 28, diode 38 and the temperature-sensitive resistor 30, the above described preferred embodiment of the device according to the present invention will achieve protection of the converter against too great an output as well as regulation of the power thereof. It will be possible in many cases to omit the temperature-sensitive resistor 30, depending for instance on the protective devices already available on connecting terminals 13 and 14.

The present invention is not however limited to the above described preferred embodiment thereof; the rights sought are defined by the following claims, within the scope of which many modifications can be envisaged.

The invention claimed is:

1. A device for converting an AC voltage from a main electricity supply to a DC voltage of a predetermined level and waveform comprising:
    a rectifier circuit to connect to the main electricity supply;
    a switching circuit connected to the rectifier circuit and through which current flows;
    a main transformer through which current flows connected to the switching circuit and having a secondary winding;
    an auxiliary transformer connected to the switching circuit that has a secondary winding with connecting terminals coupled to the secondary winding of the main transformer such that the current through the switching circuit and the main transformer is limited to a predetermined value; and
    a filter circuit connected between the rectifier circuit and the switching circuit, wherein the filter circuit comprises a number of diodes.

2. The device as claimed in claim 1, wherein the filter circuit further comprises at least one capacitor and one self-induction element.

3. The device as claimed in claim 2, wherein the switching circuit comprises a power transistor having a base, a collector and an emitter and being in common-base configuration.

4. The device as claimed in claim 3, wherein the auxiliary transformer is connected to the emitter of the power transistor.

5. The device as claimed in claim 3, wherein the switching circuit further comprises a DIAC.

6. The device as claimed in claim 5, wherein the auxiliary transformer is connected to the or emitter of the power transistor.

7. The device as claimed in claim 6, wherein the auxiliary transformer further has a diode connected between the connecting terminals of the secondary winding of the auxiliary transformer.

8. The device as claimed in claim 7, wherein the switching circuit further comprises a resistor connected between the base and the collector or emitter of the power transistor.

9. The device as claimed in claim 8, wherein the switching circuit further comprises a resistor with a temperature-dependent value connected between the base of the power transistor and the collector or emitter.

10. The device as claimed in claim 1, wherein the switching circuit comprises a power transistor having a collector and an emitter and being in common-base configuration.

11. The device as claimed in claim 10, wherein the auxiliary transformer is connected to the emitter of the power transistor.

12. The device as claimed in claim 10, wherein the switching circuit further comprises a DIAC.

13. The device as claimed in claim 12, wherein the auxiliary transformer is connected to the emitter of the power transistor.

14. The device as claimed in claim 13, wherein the auxiliary transformer further has a diode connected between the connecting terminals of the secondary winding of the auxiliary transformer.

15. The device as claimed in claim 14, wherein the switching circuit further comprises a resistor connected between the base and the collector or emitter of the power transistor.

16. The device as claimed in claim 15, wherein the switching circuit further comprises a resistor with a temperature-dependent value connected between the base of the power transistor and the collector or emitter.

17. A device for converting an AC voltage from a main electricity supply to a DC voltage of a predetermined level and waveform comprising:
    a rectifier circuit to connect to the main electricity supply;
    a switching circuit connected to the rectifier circuit and through which current flows;
    a main transformer through which current flows connected to the switching circuit and having a secondary winding; and
    an auxiliary transformer connected to the switching circuit that has a secondary winding with connecting terminals coupled to the secondary winding of the main transformer such that the current through the switching circuit and the main transformer is limited to a predetermined value, wherein the switching circuit comprises a power transistor having a collector and an emitter and being in common-base configuration.

18. The device as claimed in claim 17 further comprising a filter circuit connected between the rectifier circuit and the switching circuit.

19. The device as claimed in claim 18, wherein the filter circuit comprises at least one capacitor and one self-induction element.

20. The device as claimed in claim 17, wherein the switching circuit further comprises a DIAC.

21. The device as claimed in claim 20, wherein the auxiliary transformer is connected to the emitter of the power transistor.

22. The device as claimed in claim 21, wherein the auxiliary transformer further has a diode connected between the connecting terminals of the secondary winding of the auxiliary transformer.

23. The device as claimed in claim 22, wherein the switching circuit further comprises a resistor connected between the base and the collector or emitter of the power transistor.

24. The device as claimed in claim 23, wherein the switching circuit further comprises a resistor with a temperature-dependent value connected between the base of the power transistor and the collector or emitter.

25. The device as claimed in claim 17, wherein the auxiliary transformer is connected to the emitter of the power transistor.

26. A device for converting an AC voltage from a main electricity supply to a DC voltage of a predetermined level and waveform comprising:

a rectifier circuit to connect to the main electricity supply;

a switching circuit connected to the rectifier circuit and through which current flows;

a main transformer through which current flows connected to the switching circuit and having a secondary winding; and an auxiliary transformer connected to the switching circuit that has a secondary winding with connecting terminals coupled to the secondary winding of the main transformer such that the current through the switching circuit and the main transformer is limited to a predetermined value, wherein the auxiliary transformer further has a diode connected between the connecting terminals of the secondary windings of the auxiliary transformer.

* * * * *